Aug. 14, 1962     D. C. WRIGHT     3,049,039
CUTTING DIE SUPPORT

Filed Aug. 26, 1959     2 Sheets-Sheet 1

*INVENTOR.*
DAVID C. WRIGHT
BY
ATTYS.

INVENTOR.
DAVID C. WRIGHT
BY Oldham & Oldham
ATTYS.

United States Patent Office 3,049,039
Patented Aug. 14, 1962

3,049,039
CUTTING DIE SUPPORT
David C. Wright, Cuyahoga Falls, Ohio, assignor to The Falls Engineering & Machine Company, Cuyahoga Falls, Ohio, a corporation of Ohio
Filed Aug. 26, 1959, Ser. No. 836,197
2 Claims. (Cl. 83—652)

This invention relates to apparatus for holding and supporting cutting dies and is particularly useful in supporting dies having a plywood board in which cutting members of cutting rule are mounted although the apparatus is also useful in supporting other kinds of dies, printing plates and the like.

In the rubber, plastic, box-making and other industries where pieces of different shapes are required to be cut in quantity from sheet materials such as rubber, plastic, cardboard, leather and fabric, it has been found convenient to form dies of a plywood or other non-metallic board having cutting rule mounted therethrough to provide cutting edges above the face of the board. Such cutting dies may be laid under or over the sheet material to be cut and cutting may be accomplished either by pressure applied simultaneously to the cutting edges as in a press or by progressive application of pressure thereacross as in roller die machines.

Similar dies have also been employed for trimming molded articles of rubber or plastic from a sheet of such molded articles.

Heretofore it has been the practice with some cutting machines to mount the cutting die board or support it upon a metal platen, to lay the material to be cut over the die board and to pass a hardened pressure roller progressively thereover. It has been found more desirable in many cases to advance sheet material across a backing platen, to support the cutting dies above the sheet material with their cutting edges depending, and to apply pressure progressively to the upper face of the die board, the die board being lifted above the sheet material between cuts. In apparatus of this type heretofore constructed it has been found difficult to support the die boards so that pressure is applied effectively to all the cutting edges, to quickly change dies, and to clamp the dies securely in place.

It is the object of the present invention to overcome the foregoing and other difficulties by providing uniform pressure at the cutting edges, quick die changeability, and secure clamping of the die board.

Other objects are to provide against tipping of the support regardless of an unbalanced distribution of cutting edges, to provide a hardened flexible cover plate through which pressure may be transferred to the cutting edges, and to provide for attachment of the support to die-lifting mechanism.

These and other objects will appear from the following description and the accompanying drawings forming a part hereof.

Figure 1:
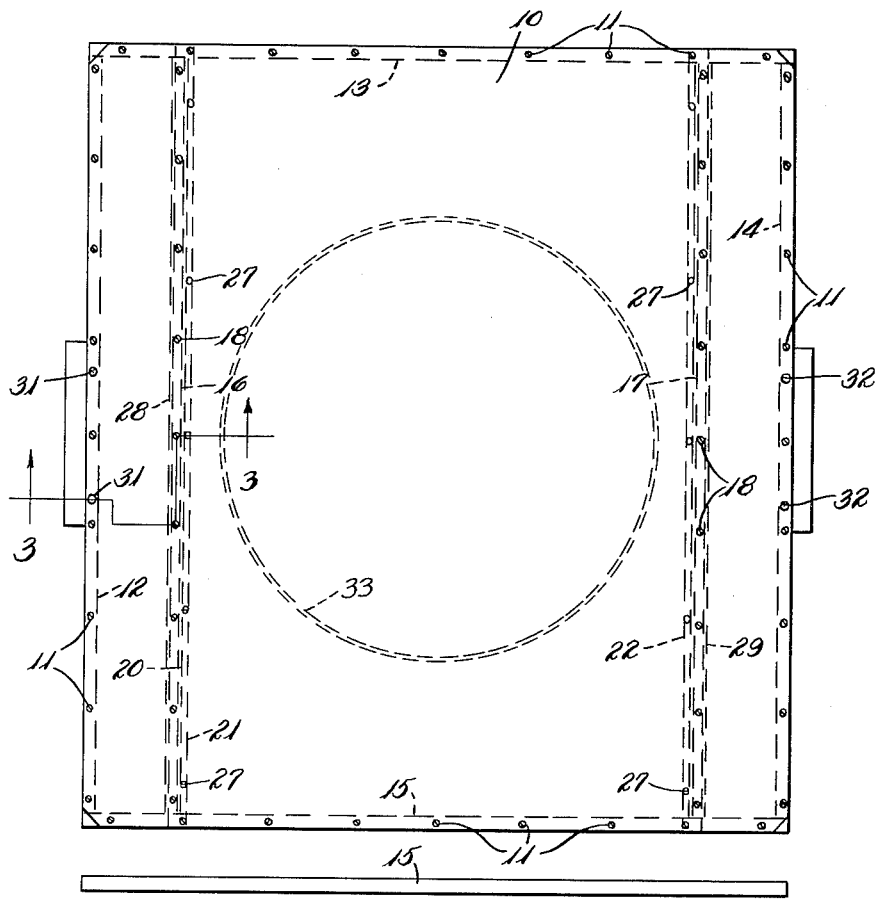
FIG. 1 is a top face view of a cutting die support constructed in accordance with and embodying the invention with a cutting die secured therein.

Referring to the drawings, the numeral 10 designates a cover plate of thin flexible hardened steel, secured all about its four margins, as by counter sunk screws 11 to marginal frame elements 12, 13, 14, 15. Frame elements 12, 13 and 14 are preferably welded to one another at their ends whereas frame element 15 is removable to permit edgewise insertion of die boards. Two parallel frame elements 16, 17 are also provided and are spaced inwardly of and parallel to frame elements 12 and 14 respectively and are secured to cover plate 10, as by countersunk screws 18. Frame members 16, 17 are also welded at one end of each to frame elements 13.

Figure 3:
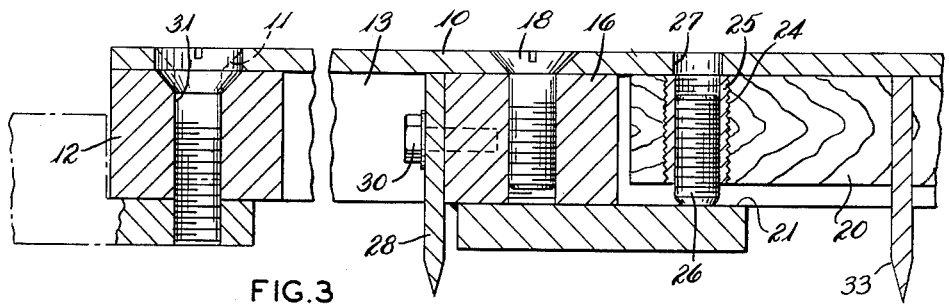
FIG. 3 is a cross-sectional view taken on line 3—3 of FIG. 1 to an enlarged scale.
Figure 2:
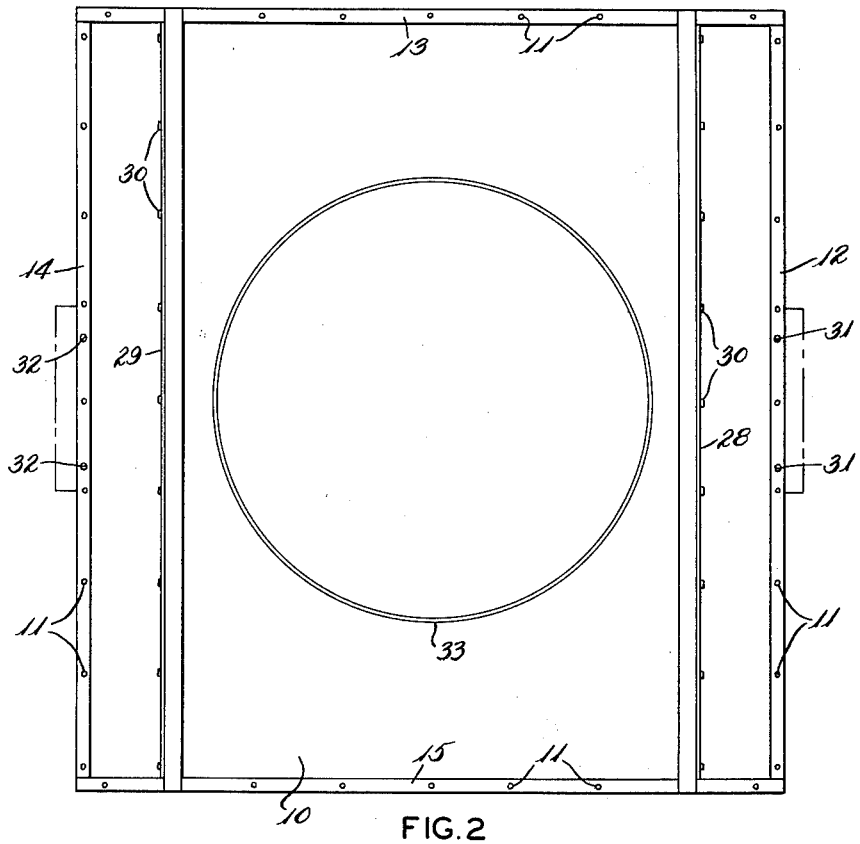
FIG. 2 is a bottom face view thereof.
Figure 4:
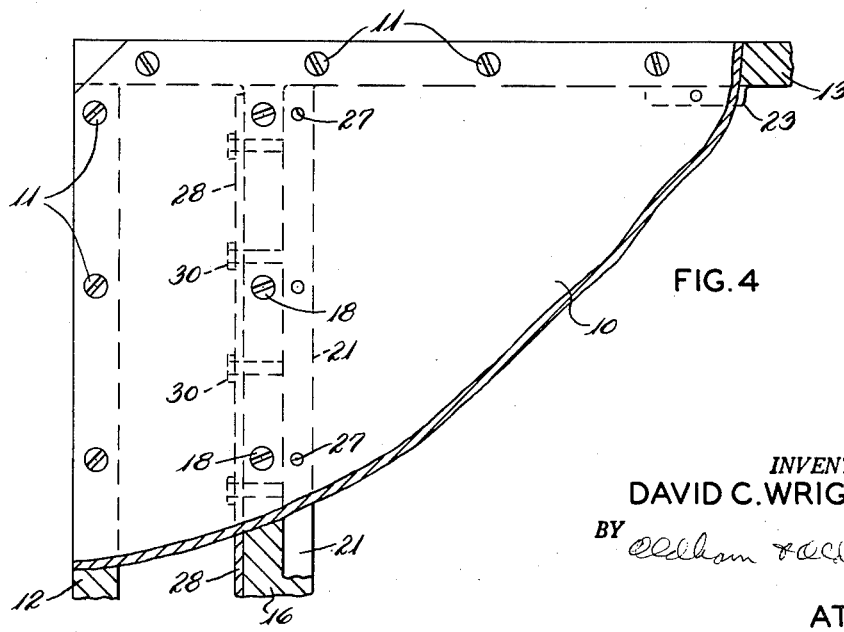
FIG. 4 is an enlarged top face view of a corner of the die support with the die removed, other portions being broken away and shown in section.

The marginal frame elements 16, 13, 17 and 15 enclose a rectangular space slightly larger than the cutting die boards. The die board 20 is shown in section in FIG. 3 and is of less thickness than the depth of the frame elements. For supporting the die board 20 frame elements 16 and 17 are provided with inwardly directed flanges 21, 22 respectively which underlies margins of the die board. These flanges may be integral with the frame elements 16, 17 or secured as by welding thereto. For further supporting the die board 20 projections may also be provided on frame elements 13 and 15 and may be of short extent, as the projection 23 shown in FIG. 4.

For clamping the die board in place, margins of the board which overlie the flanges 21, 22 and other projections such as 23 have vertically extending holes 24 therethrough in which are secured internally threaded metal bushings 25. The bushings are secured against axial movement in the holes as by being externally threaded and screwed into the openings or by being flanged or otherwise secured. It will be understood that the die boards are usually of wood such as plywood, and that a cutting rule 33 is mounted therein and extends from the upper face or back of the die board to a position beyond its lower or front face. The bushings 25 may be of the so-called self-tapping thread type and are forced into the openings and extend only from face to face of the board 20.

Set screws 26 of the headless type are screwed into the bushings 25 and are adapted to engage the flanges or projections on the marginal frame elements to force the margins of the cutting board against the cover plate. This assures that the back face of the cutting die board is properly seated against the cover plate and is clamped against shifting movement.

For providing adjusting access to the set screws 26, clearance openings 27 are provided through the cover plate 10 in alignment with the set screws. A screwdriver or wrench may be passed through these openings to clamp the set screws.

To support the cutting die and its support from the material therebelow without tipping whether cutting edges are provided at all positions on the cutting area or not, a pair of strips of cutting rule 28, 29 are mounted along frame elements 16, 17 at opposite margins of the support. They are secured to frame elements 16, 17 by screws 30 with their back edges resting against the cover plate 10 and their cutting edges spaced downwardly therefrom by the same amount as the cutting rule edges of the die board.

In order to provide pressure at each portion of the cutting die the cover plate should have sufficient flexibility to yield readily to pressure. This is especially important where the die and support are used in a machine where pressure is applied by progressively moving a pressing roller across the cover plate. It has been found that a hardened steel cover plate substantially one-eighth of an inch thick provides sufficient flexibility where the die support is about 66 inches long and 72 inches wide. At the same time it is necessary that the plate be of sufficient hardness to back up the cutting rule of the dies without being peened or indented permanently by the pressure. With die supports of smaller dimensions a plate thinner than one-eighth inch might be desirable.

In the use of the cutting die support in a roller press machine, it is advantageous to provide means for lifting the cutting die and its support from the material operated upon between cutting operations. For this purpose, the marginal frame elements 12, 14 are provided spaced outwardly from the region occupied by the cutting dies and provides a means for engaging the lifting mechanism of the roller press. The frame elements 12, 14 are therefore provided near their centers with bolt holes 31, 32 for securing the die support to a lifting mechanism.

For changing dies, the frame element 15 may be removed by removing the screws securing it to the cover plate, loosening the set screws 26 and sliding the die boards edgewise out and into place.

While one embodiment of the invention has been shown and disclosed herein, it will be appreciated that modification thereof may be made without departing from the scope of the invention as it is defined by the following claims.

I claim:

1. In combination, a cutting die board and a cutting die support comprising a cover plate of hardened steel, at least two marginal frame elements rigidly secured to the lower face of said cover plate to surround margins of said die board, said marginal frame elements having inwardly directed flanges spaced from said cover plate a distance greater than the thickness of said die board, said frame elements being mounted to underlie said die board, a plurality of vertically extending internally threaded sleeves carried by said die board vertically above each of said flanges, clearance openings being provided through said cover plate in alignment with said threaded sleeves to provide access thereto, and socket head type set screws engaged in said threaded sleeves and vertically adjustable therein to abut said flanges and force said die board against the lower surface of said cover plate whereby said die board is held tightly in place and the upper surface of said cover plate has no members protruding therefrom.

2. A combination as in claim 1 where a cutting rule is carried by said die board and projects downwardly therefrom beyond said flanges, and a pair of lands are secured to said cover plate adjacent opposite margins thereof and equal in projection from said cover plate to that of said cutting rule.

References Cited in the file of this patent

UNITED STATES PATENTS

| | | |
|---|---|---|
| 2,100,847 | Halstead | Nov. 30, 1937 |
| 2,121,003 | Balfe | June 21, 1938 |
| 2,235,948 | Schwisow | Mar. 25, 1941 |
| 2,268,856 | Cummings | Jan. 6, 1942 |
| 2,271,540 | Buckey | Feb. 3, 1942 |
| 2,275,367 | James | Mar. 3, 1942 |
| 2,500,021 | Black | Mar. 7, 1950 |
| 2,888,112 | Keller | May 26, 1959 |
| 2,933,167 | Keller | Apr. 19, 1960 |